Jan. 12, 1965   B. T. WOODLE   3,165,016
MACHINE TOOL SPINDLE
Filed Nov. 23, 1962   2 Sheets-Sheet 1

BILLY TED WOODLE
INVENTOR.

BY *Herbert J. Brown*

ATTORNEY

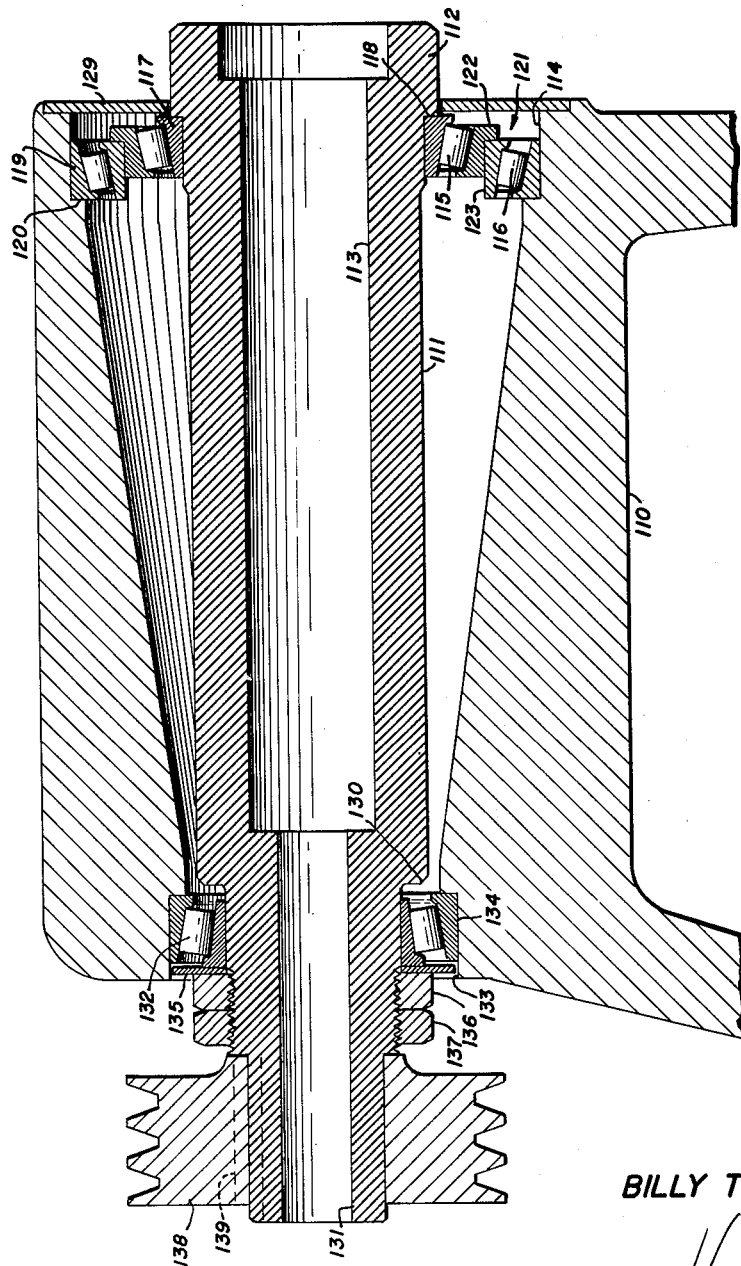

United States Patent Office 3,165,016
Patented Jan. 12, 1965

3,165,016
MACHINE TOOL SPINDLE
Billy Ted Woodle, Fort Worth, Tex., assignor to American Manufacturing Company of Texas, Fort Worth, Tex., a corporation of Texas
Filed Nov. 23, 1962, Ser. No. 239,500
3 Claims. (Cl. 82—30)

This invention relates to machine tool spindles and has reference to a bearing assembly therefor.

With the advent of ceramic and other high speed cutting tools, the present heavy duty spindle bearings cannot turn fast enough to accomplish maximum cutting speeds. Excessive heat is generated in the bearings and causes them to break down.

Generally, the invention is directed to a roller bearing assembly supporting a heavy duty spindle, said bearing assembly having inner and outer rows of bearings and the equivalent of a single race therebetween whereby the rate of rotation of all bearings is less, for a given cutting speed and inner race bearing diameter, than if a single row of bearings were employed.

An object of the invention is to provide a bearing assembly for heavy duty spindles whereby such spindles may be rotated at increased revolutions per minute to increase surface cutting speeds.

Another object is to provide a simplified and economical construction for the described purpose.

Another object of the invention is to provide a bearing assembly for a heavy duty spindle having a large diameter at its tool receiving end and inner and outer rows of bearings therearound, and a reduced diameter at its opposite end and a single row of bearings therearound for further reducing the cost of manufacture.

These and other objects will become apparent from the following description and the acompanying drawings, wherein:

FIGURE 3 is a vertical sectional view similar to FIGURE 1 and showing a spindle having a reduced diameter at its drive end and a single row of roller bearings therearound.

Figure 1:
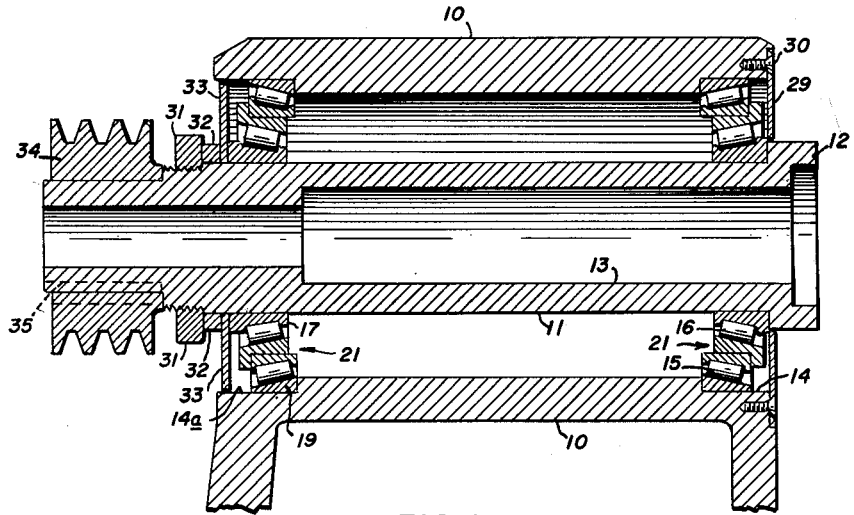
FIGURE 1 is a vertical sectional view of a headstock and spindle supported therein by bearing assemblies in accordance with the present invention.
Figure 2:
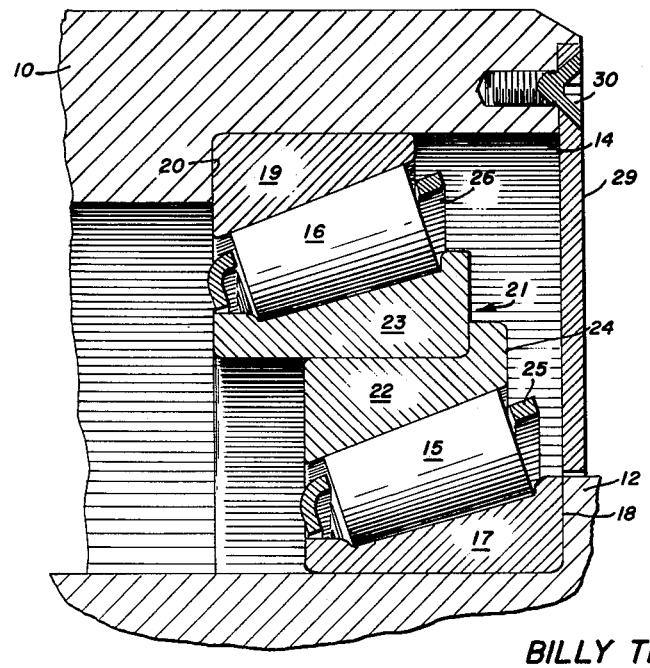
FIGURE 2 is an enlarged fragmentary sectional view of the right upper portion of FIGURE 1.

The form of the invention illustrated in FIGURES 1 and 2 includes a headstock 10 and a spindle 11 extending therethrough. The forward or tool receiving end of the spindle is enlarged at 12 and has a central bore 13 for receiving the spindle of a chuck or the like, not shown. The end of the headstock 10 adjacent the spindle enlargement 12 is counterbored, at 14, to locate inner and outer rows of conical roller bearings 15 and 16. The inner race 17 of the inner row of bearings 15 abuts the inner face 18 of the spindle enlargement 12 and the outer race 19 of the outer row of bearings 16 abuts the face or shoulder 20 of the counterbore 14.

Between the two rows of bearings 15 and 16 there is the equivalent of a single race 21 comprised of inner and outer rings 22 and 23, one of said rings being received in the other said ring. The outer end of the outer race of the inner row of bearings 15 is flanged, at 24, to locate the inner ring 23 of the outer row of bearings 16. Both inner and outer rows of bearings 15 and 16 may have conventional retainers or "cages" 25 and 26. A flat circular lubricant retainer 29 closes the outer end of the counterbore 14 and is held in place by screws 30.

The remaining end of the headstock 10 is also counterbored, as at 14a, and the bearings, races and rings therein are identical with those described in the foregoing and have the same reference numerals; however, it is to be noted that these parts are reversed with reference to the first described parts and which arrangement has to do with adjusting the bearings. An adjustment nut 31 is threadedly mounted on the spindle 11 outwardly of the headstock 10 and bears against a spacer ring 32, a flat circular lubricant retainer 33 and against the outer face of the innermost bearing race 17. A sheave 34 is mounted on the extending end of the spindle 11 and is keyed thereto at 35.

The form of the invention illustrated in FIGURE 3 includes a headstock 110 similar to the previously described headstock 10 and has a spindle 111 extending therethrough. As before, the tool receiving end of the spindle 111 is enlarged, at 112, and which end of the spindle includes a central tool receiving bore 113. There is a counterbore 114 in the headstock 110 for receiving inner and outer rows of conical roller bearings 115 and 116, an inner race located against the inner face 118 of the enlargement 112, an outer race 119 which abuts the shoulder 120 of the counterbore 114, and the equivalent of a single race 121 comprised of inner and outer rings 122 and 123. As before, these rings 122 and 123 fit one within the other. A flat lubricant retainer 129 fits around the enlargement 112 of the spindle 111 and closes the end of the counterbore 114.

Within the remaining end of the headstock 110, the spindle 111 is shouldered, at 130, and the outwardly extending end 131 of the spindle is of reduced diameter and has a single row of conical roller bearings 132 therearound. This end of the headstock 110 is also counterbored at 133 to receive an outer race 134. The inner race, which is mounted on the reduced diameter 131 has a circular lubricant retainer 135 thereagainst and there is a threaded adjustment nut 136 bearing against the retainer, and a jamb nut 137 bears against the adjustment nut 136. The extending end 131 of the spindle has a sheave 138 mounted thereon and which sheave is secured against relative rotation by a key 139.

Referring now to the operation of the first described form of the invention, the spindle 11 is driven by the sheave 34 mounted on the extending end thereof and the innermost race 17 turns at the same rate as the spindle. The outermost race 19 is stationary and the intermediate race 21 comprised of rings 22 and 23, rotates at an intermediate speed. Thus, the speed of rotation of the innermost bearings 15 is less, for a given cutting speed and inner race diameter, than if there were a single row of bearings, and thus makes possible increased revolutions per minute of the spindle 11.

The form of the invention illustrated in FIGURE 3 operates in the same manner, except that the single row of bearings 132 does not have the advantage of the floating intermediate race. However, since this row of bearings is of reduced diameter its relative speed is not great and does not, therefore, heat readily.

The invention is not limited to the exemplary constructions herein shown and described, but may be made in various ways within the scope of the appended claims.

What is claimed is:

1. In a machine tool, a headstock, a spindle within said headstock, drive means mounted on said spindle, inner and outer rows of bearings around said spindle, at least one independent freely rotatable race between said inner and outer rows of bearings and positioned for coaction therewith, a race on said spindle coactive with said inner row of bearings, and a race in said headstock coactive with said outer row of bearings.

2. In a machine tool as defined in claim 1, the construction wherein: said race between said inner and outer rows of bearings is comprised of inner and outer rings, one said ring being received within the other said ring.

3. In a machine tool, a headstock, a cylindrical spindle within said headstock, said spindle having a large diameter within said headstock and a smaller diameter within said headstock, drive means mounted on said spindle, inner and outer rows of bearings around said large diameter of said spindle, at least one independent freely rotatable race between and coactive with said inner and outer rows of bearings, and a single row of bearings around said small diameter of said spindle and located within said headstock.

References Cited by the Examiner
UNITED STATES PATENTS

| | | | |
|---|---|---|---|
| 437,997 | 10/90 | Kenney | 308—183 X |
| 605,845 | 6/98 | Belanger | 308—183 X |
| 1,402,794 | 1/22 | Reese | 82—28 X |
| 2,347,259 | 4/44 | Groene | 82—28 |
| 2,360,576 | 10/44 | Overstedt | 82—28 |
| 2,577,942 | 12/51 | Agins | 308—183 X |
| 3,011,364 | 12/61 | Mims | 308—183 X |

WILLIAM W. DYER, Jr., *Primary Examiner.*